United States Patent
Biggs et al.

(10) Patent No.: US 8,488,818 B2
(45) Date of Patent: Jul. 16, 2013

(54) INTERIOR STRUCTURAL ASSEMBLY FOR A VEHICLE

(75) Inventors: Christopher Biggs, New Hudson, MI (US); Michael Eberlein, Plymouth, MI (US)

(73) Assignee: Nissan North America, Inc., Franklin, TN (US)

( * ) Notice: Subject to any disclaimer, the term of this patent is extended or adjusted under 35 U.S.C. 154(b) by 706 days.

(21) Appl. No.: 12/688,231

(22) Filed: Jan. 15, 2010

(65) Prior Publication Data

US 2011/0176689 A1    Jul. 21, 2011

(51) Int. Cl.
*H04R 5/02* (2006.01)

(52) U.S. Cl.
USPC ............................. 381/302; 381/86; 296/70

(58) Field of Classification Search
USPC ...................... 381/86, 302; 296/70
See application file for complete search history.

(56) References Cited

U.S. PATENT DOCUMENTS

| 3,002,781 | A | 10/1961 | Lenz et al. |
| 5,333,901 | A | 8/1994 | Barnes |
| 5,416,283 | A | 5/1995 | Dault et al. |
| 6,217,098 | B1 | 4/2001 | O'Brien et al. |
| 8,073,156 | B2 * | 12/2011 | Hutt et al. ......... 381/86 |
| 2006/0040605 | A1 * | 2/2006 | Lee ................ 454/121 |
| 2008/0310668 | A1 | 12/2008 | Koch et al. |

* cited by examiner

*Primary Examiner* — Disler Paul
(74) *Attorney, Agent, or Firm* — Young, Basile, Hanlon & MacFarlane, P.C.

(57) ABSTRACT

Disclosed herein is an interior structural assembly for a vehicle. The assembly includes a defrost panel forming at least a portion of a defrost duct, the defrost panel has first and second panel extensions laterally extending at opposite ends of a defrost base and an instrument panel overlaying the defrost panel, the instrument panel having at least one defrost aperture and first and second ends generally horizontally extending across the interior width of the vehicle, wherein the first and second panel extensions extend to the first and second ends of the instrument panel, respectively.

19 Claims, 6 Drawing Sheets

US 8,488,818 B2

INTERIOR STRUCTURAL ASSEMBLY FOR A VEHICLE

FIELD OF THE INVENTION

The present invention generally pertains to an interior structural assembly for a vehicle and more specifically, a defrost panel structure for mounting a speaker.

BACKGROUND

Some vehicles include speakers that are located at end portions of an instrument panel and adjacent to a windshield. Some of these speakers are mounted on an inner surface of the instrument panel. Conventionally, for example, the speakers are mounted to the inner surface by having an attachment mechanism molded into the instrument panel. In another instance, for example, the speakers are attached to the inner surface via brackets/clips during vehicle assembly. By having to account for these attachment mechanisms in the design of the instrument panel, valuable and limited vehicle space is utilized.

Furthermore, rear portions of many instrument panels slope downward toward the windshield. Speakers are sometimes mounted such that they are angled rearward with respect to the plane of the windshield so that vehicle occupants can hear the sound produced thereby. These factors can contribute to an increased amount of space needed at the bottom of the instrument panel slope to accommodate the speakers as well as any attachment mechanisms associated with them, which can limit styling freedom.

SUMMARY

Embodiments of an interior structural assembly for a vehicle are disclosed herein. In one such embodiment, the assembly includes a defrost panel forming at least a portion of a defrost duct. The defrost panel has first and second panel extensions laterally extending at opposite ends of a defrost base. The assembly also includes an instrument panel overlaying the defrost panel. The instrument panel has at least one defrost aperture and first and second ends generally horizontally extending across substantially the interior width of the vehicle.

Embodiments of a speaker assembly for a vehicle are also disclosed herein. In one such embodiment, the assembly includes a speaker, a defrost panel and an instrument panel. The defrost panel has at least one panel extension laterally extending at an end of the defrost panel. The speaker is mounted in an aperture of the at least one panel extension. The instrument panel overlays the defrost panel and has first and second ends generally horizontally extending across the interior width of the vehicle.

Other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Defrost panels can accommodate windshield defroster ducts below the instrument panel that run laterally adjacent to the windshield. Conventionally, some windshield defroster ducts only occupy a fraction of the overall length of the instrument panel. Embodiments of the present invention include a defrost panel having structural components capable of accommodating mounting locations for one or more speakers. Accordingly, rather than attaching the speakers directly to, for example, the inner surface of the instrument panel as described previously, the speakers can be mounted to the aforementioned structural components of the defrost panel. The speakers can be, for example, attached at approximately the same location as they conventionally might otherwise be attached directly to the instrument panel.

Figure 1:
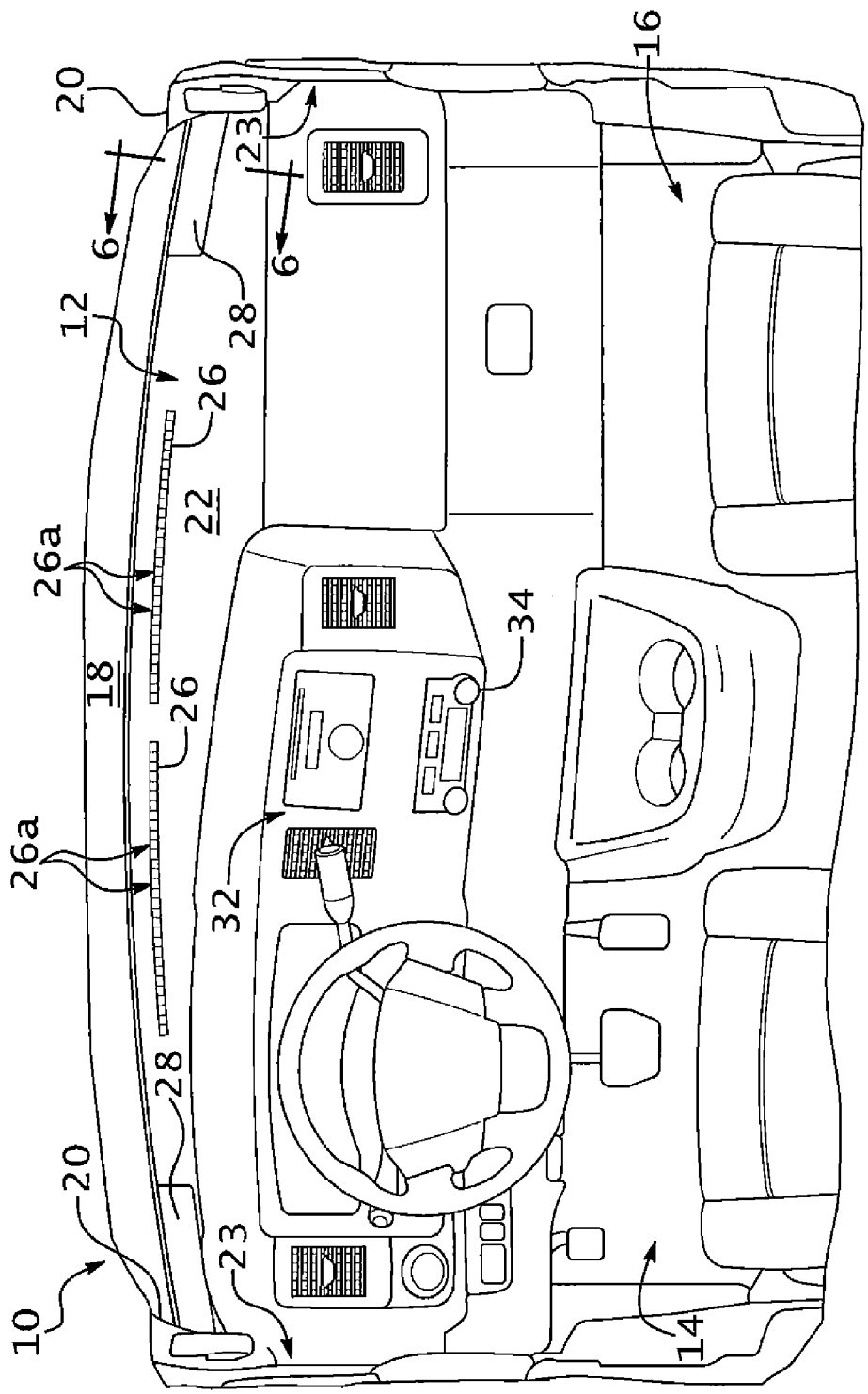
FIG. 1 is a perspective view of a passenger compartment having an interior structural assembly according to one embodiment of the present invention.

Referring to FIGS. 1-6, a passenger vehicle 10 includes an interior structural assembly 12 according to one embodiment of the present invention. As shown in FIG. 1, vehicle 10 contains a driver compartment 14, a passenger compartment 16, a windshield 18, A-pillars 20, and front-side windows 23. A-pillars 20 separate windshield 18 from front-side windows 23. Although a passenger vehicle is shown, embodiments of the present invention may be used with any other type of vehicle having any other interior/exterior design or configuration such as a truck, boat, bus, etc.

Interior structural assembly 12 includes an instrument panel 22 overlaying a defrost panel 24. The defrost panel 24 includes a portion of a defrost duct 25 (shown in FIG. 5). As shown, the instrument panel 22 projects rearward and extends substantially the entire width of the vehicle 10 along a lower end portion of the windshield 18 and is made of a single piece of material. The instrument panel 22 gently slants rearward into both the driver compartment 14 and the passenger compartment 16. The instrument panel 22 can be made of, for example, a synthetic resin material or any other suitable material. However, in other embodiments, the instrument panel 22 can have a different configuration than that shown in FIG. 1. For example, the instrument panel 22 can be made of more than one piece or does not have to substantially extend the entire width of the vehicle 10. The instrument panel 22 also includes a defroster vent 26 with one or more defrost apertures 26a for supplying air from the defrost panel 24. In the embodiment shown in FIG. 1, the defroster vent 26 occupies less than substantially the entire length of the instrument panel 22. The instrument panel 22 also includes a speaker grille 28 mounted over a speaker 30 attached to the defrost panel 24. The speaker grille 28 can connect to the instrument panel so that when it is installed, its top surface is substantially flush with the top surface of the instrument panel. Of course, other embodiments can include different structures of instrument panel 22 and are not limited to those shown in the Figures.

A central console portion 32 extends downward from a central portion of the instrument panel 22. The central console portion can provide access to a user control 34 to, for example, adjust the volume of the speaker 30. The central console portion 32 can also house various other components, such as HVAC controls, HVAC air outlets, an audio system, etc.

Figure 2:
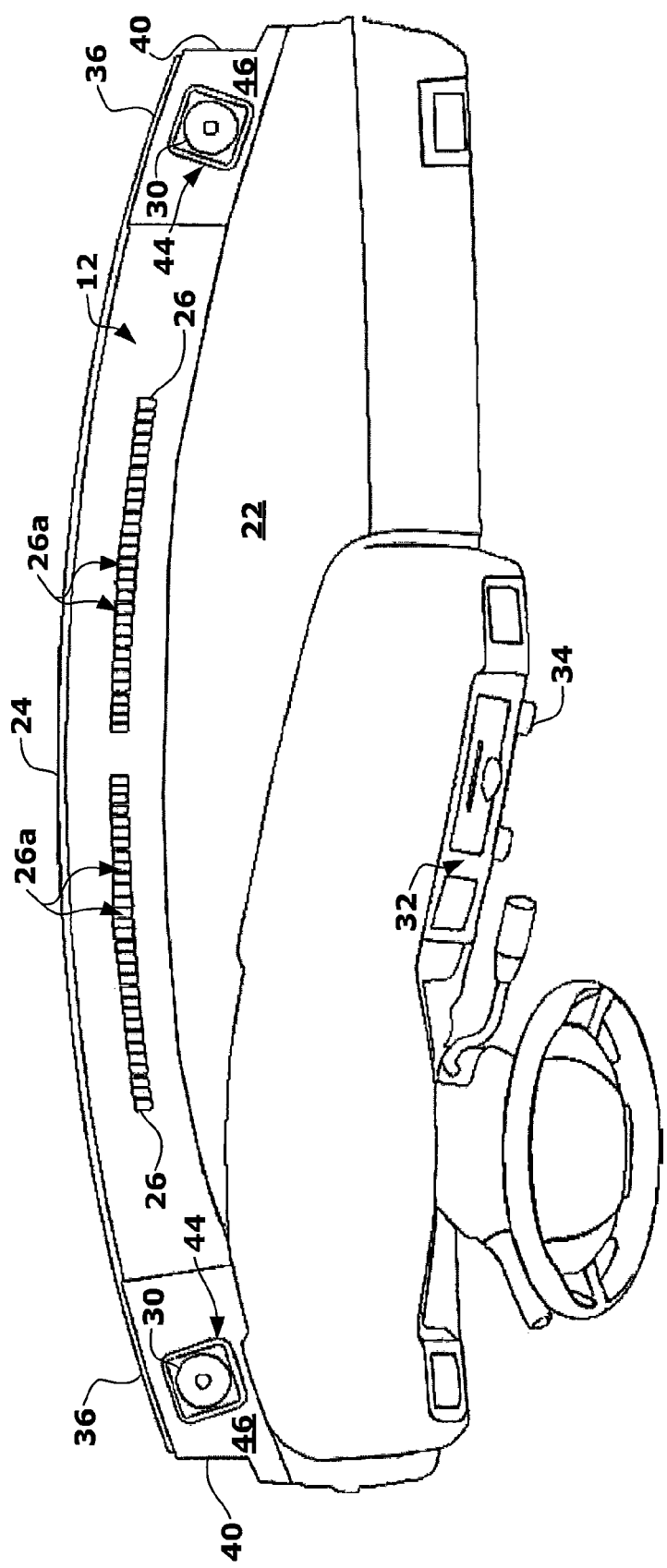
FIG. 2 is a top plan view of an instrument panel and a defrost panel of the interior structural assembly of FIG. 1.
Figure 3:
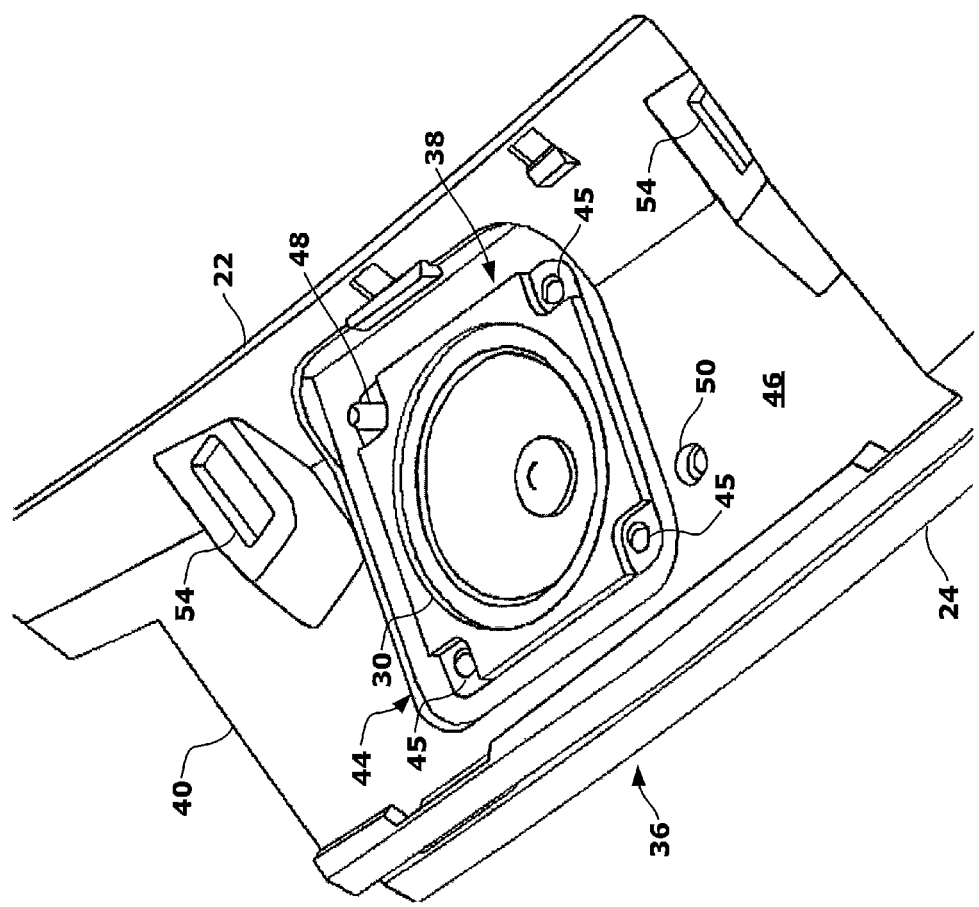
FIG. 3 is an enlarged partial perspective view of the instrument panel and the defrost panel of FIG. 2.
Figure 4:
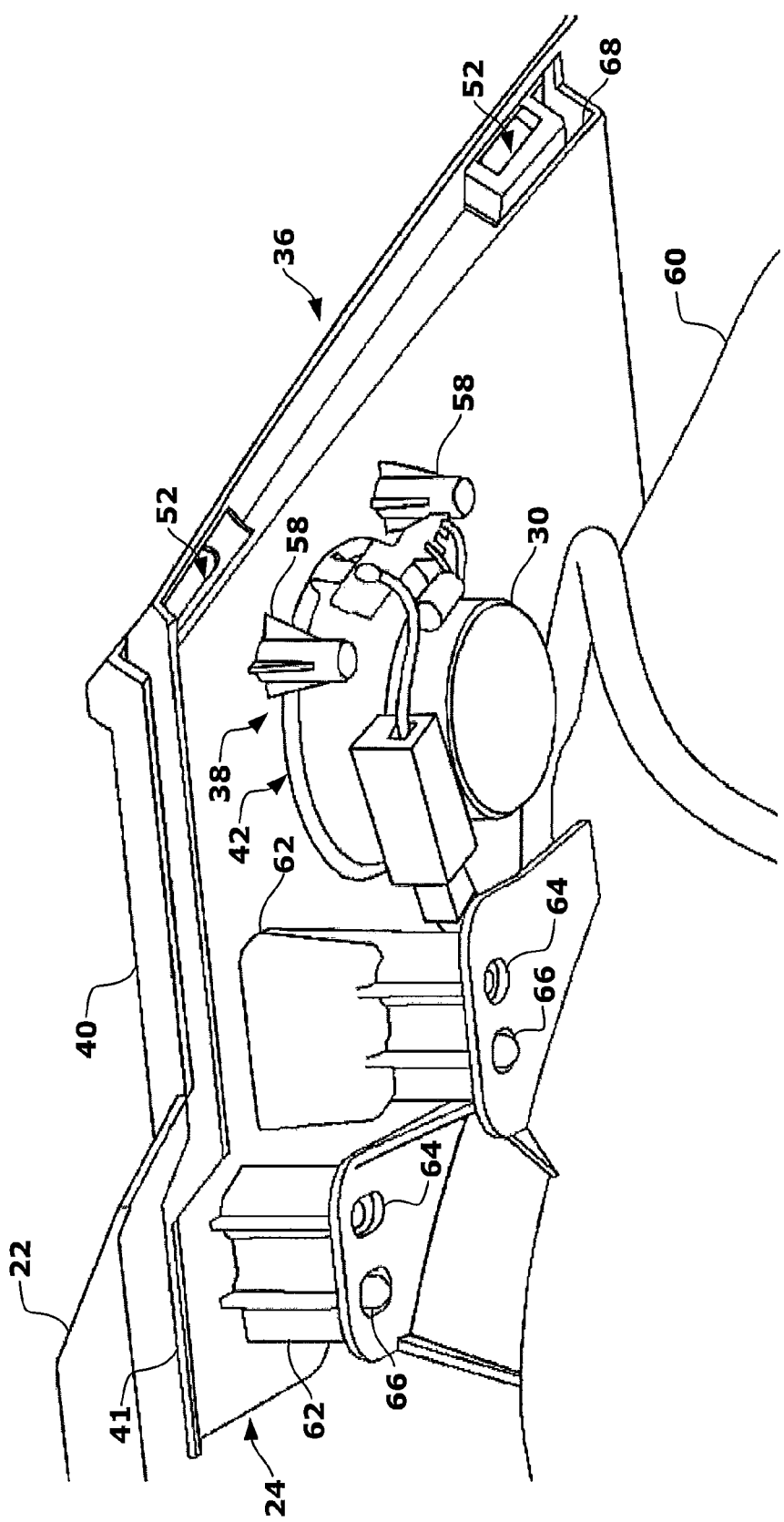
FIG. 4 is an enlarged partial bottom perspective view of the instrument panel and the defrost panel of FIG. 2.

Referring to FIGS. 2 and 3 the defrost panel 24 includes two panel extensions 36 with each panel extension 36 having a speaker mounting structure 38. The panel extensions extend laterally from a defrost base 41 (shown in FIG. 5) and extend to ends 40 of the instrument panel 22. Although two panel extensions are shown, in other embodiments, a defrost panel may only have one panel extension 36 extending from either end of the defrost base. In other words, if a second speaker is desired or required, it may be attached using conventional means. Since, for example, the panel extensions 36 extend to the ends of 40 of the instrument panel 22, the overall stiffness and rigidity of the interior structural assembly 40 is increased. However, the panel extensions 36 do not necessarily have to extend to the ends 40 of the instrument panel and may extend to any length from the defrost base 41 as desired or required.

Each speaker mounting structure 38 includes a speaker aperture 42 for receiving the speaker 30. The speaker aperture 42 can be aligned with an instrument panel aperture 44 in a speaker ledge 46 in instrument panel 22. Although each panel extension 36 is shown as having one speaker mounting structure, in other embodiments, multiple speaker mounting structures can be included that hold, for example, smaller-sized speakers.

The panel extension 36 is covered by the speaker ledge 46. The speaker mounting structure 38 of panel extension 36 includes a speaker locating projection 48 that can assist in aligning the speaker 30 to its proper position. Speaker mounting structure 38 also includes three speaker fastening structures 45 for fastening the speaker to the panel extension 36. In this manner, the speaker can be secured in an upright position. The speaker fastening structures 45 can be molded directly into the defrost panel 24, which permits a reduction of the number of parts and cost. In other words, embodiments of the present invention may render the use of additional attachment mechanisms (e.g. brackets or clips) to secure the speaker unnecessary.

The instrument panel 22 and the defrost panel 24 can be secured together. The defrost panel 24 can be, for example, attached to the instrument panel 22 by welding, screws, clips, adhesive or any other suitable attachment mechanism. In the embodiment shown, an instrument panel fastening structure 50 such as an aperture can be included in the panel extension 36 and can be secured using a fastener (not shown) such as a clip, hook or screw that passes through the instrument panel 22 and engages the defrost panel 24. Further, the sides of the instrument panel 22 and the defrost panel 24 can be engaged using snap-fit connections 52 (shown in FIG. 4). Further, grille locating apertures 54 can receive, for example, a securing member, such as a catch to form a snap-fit engagement with the speaker grille 28. Although two grille locating apertures 54 are shown, the instrument panel 22 can include any number of grille locating apertures 54.

Referring again to FIG. 4, a partial bottom perspective view of the instrument panel 22 and the defrost panel 24 is shown. Each of the three speaker fastening structures 45 corresponds with a threaded boss 58 (only two can be seen in FIG. 4) vertically projecting downward from a bottom surface of the instrument panel 22. Accordingly, for example, the speaker 30 can be engaged with the speaker fastening structure 45 by using a screw. Of course, the speaker 30 may be attached using any other mechanism (e.g., clips, adhesive, welding) and is not limited to that shown.

Figure 5:
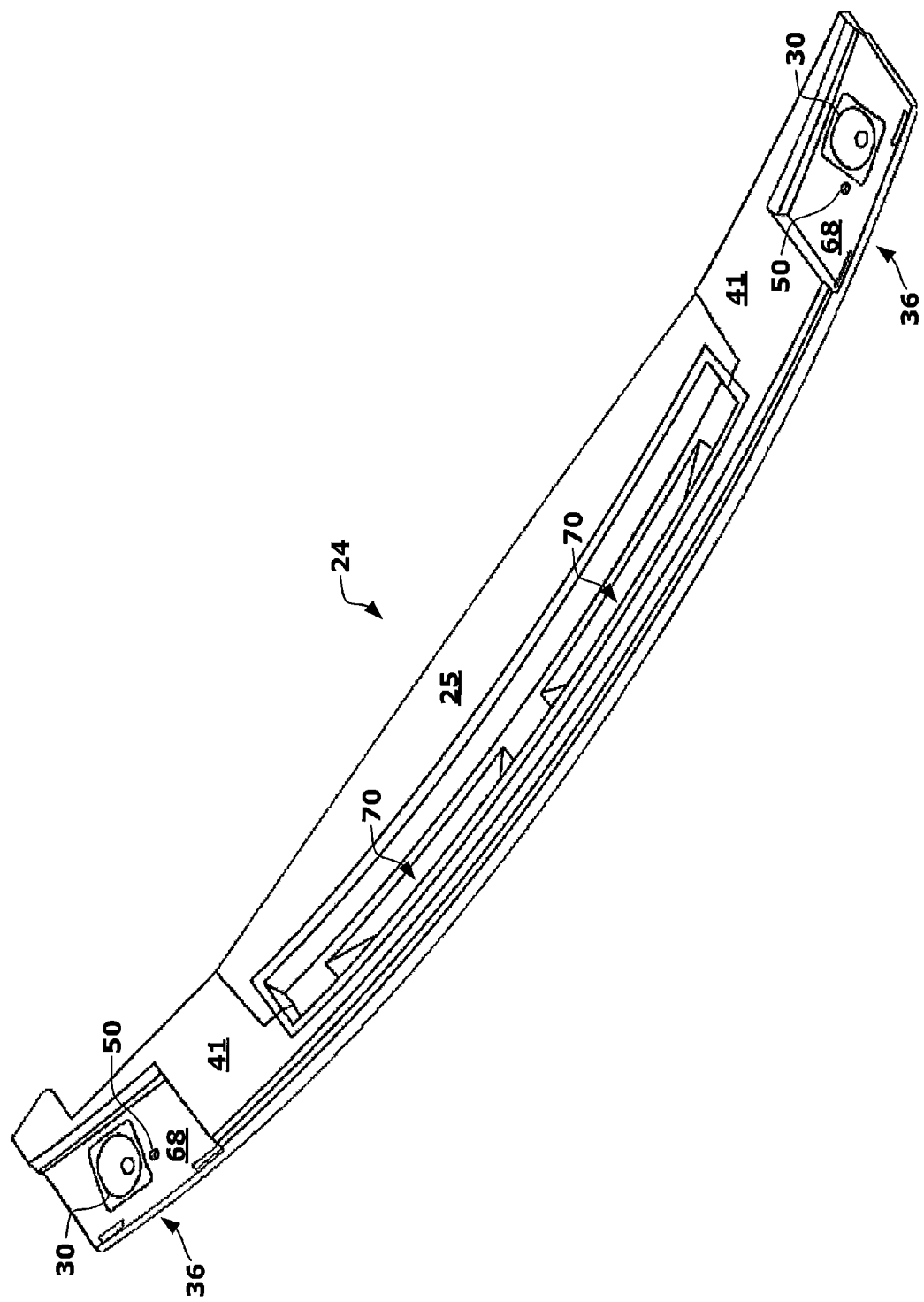
FIG. 5 is a perspective view of the defrost panel of FIG. 3.
Figure 6:
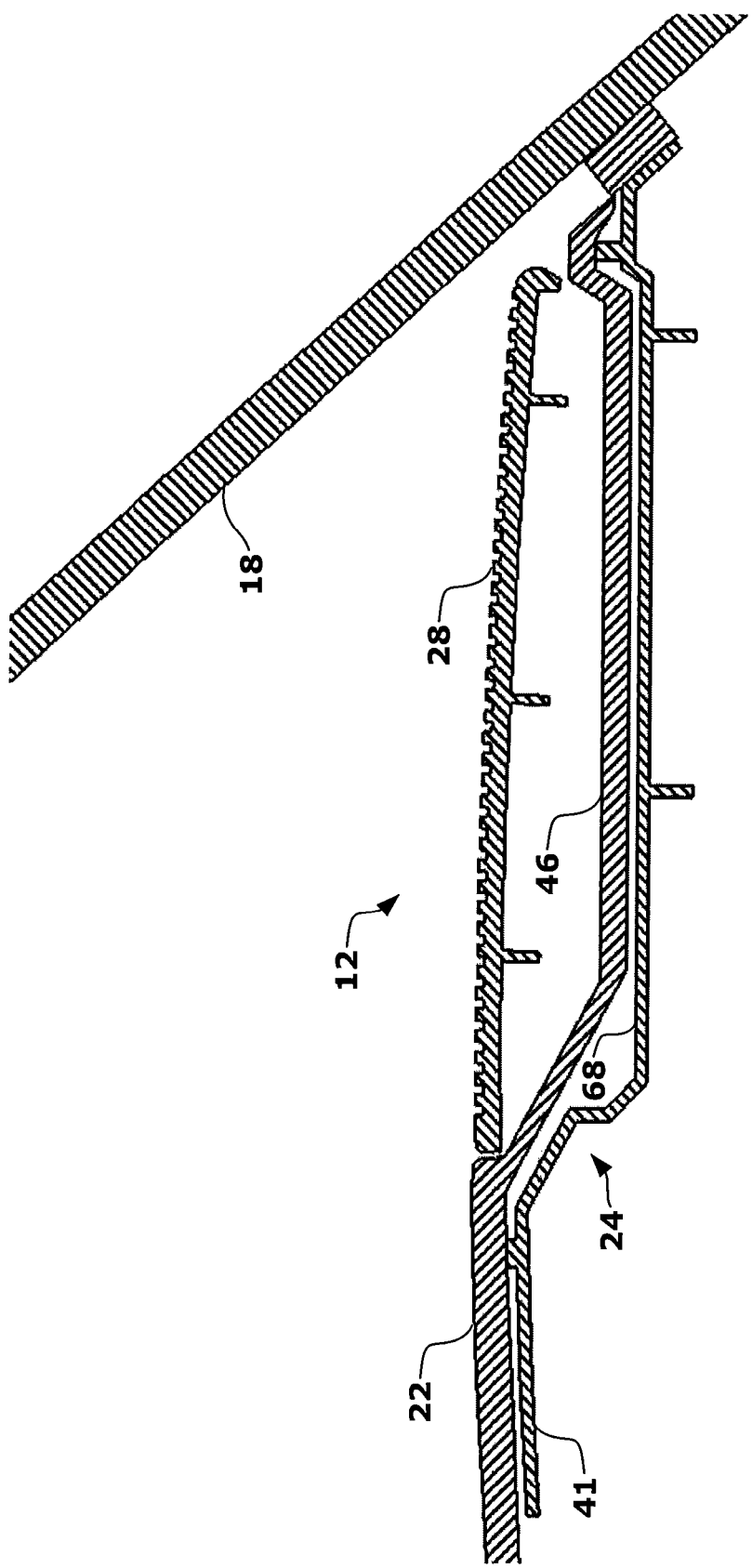
FIG. 6 is a cross-section of the instrument panel and the defrost panel taken along line 6-6 of FIG. 1.

The defrost panel 24 is separated from and can also be supported by a side window defrost duct 60 for supplying air to front side windows 23. Mounting standoffs 62 separate the defrost panel 24 from the side window defrost duct 60. The defrost panel 24 can be aligned with the side window defrost duct 60 using defrost panel locating structures 66 and secured using defrost panel fastening structures 64. As shown, defrost panel fastening structure 64 is a threaded boss that can be secured to side window defrost duct 60 using a screw. However other attachment mechanisms (e.g., clips, adhesive, welding) can be used in lieu of a boss and screw combination Referring to FIG. 5 the defrost panel 24 is illustrated without the instrument panel 22. Each panel extension 36 includes a speaker recess 68 for accommodating the speaker mounting structure 38. As shown in FIG. 6, the speaker recess 68 extends below the defrost base 41 and similarly, the speaker ledge 46 extends below a top surface of the instrument panel 22. As discussed previously, the panel extensions 36 extend from the defrost base 41. Defrost duct 25 is also connected to the defrost base 41 and has windshield defroster passageways 70 for providing air to windshield 18. The defrost duct 25 can include multiple windshield defroster passageways 70 as illustrated in FIG. 5 or alternatively can include only a single one of the windshield defroster passageways 70.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An interior structural assembly for a vehicle, comprising:
    a defrost panel forming at least a portion of a defrost duct, the defrost panel having first and second panel extensions laterally extending at opposite ends of a defrost base, wherein at least one of the first and second panel extensions includes a speaker mounting structure;
    an instrument panel overlaying the defrost panel and having at least one defrost aperture and first and second ends generally horizontally extending across substantially the interior width of the vehicle, wherein the first and second panel extensions extend to the first and second ends of the instrument panel, respectively; and
    a vehicle speaker positioned below a top surface of the instrument panel and attached to the least one of the first and second panel extensions at the speaker mounting structure.

2. The interior structural assembly of claim 1, wherein the defrost duct corresponds in size and shape with the at least one defrost aperture.

3. The interior structural assembly of claim 1, wherein the defrost panel connects to the instrument panel at the first and second panel extensions.

4. The interior structural assembly of claim 1, wherein the at least one defrost aperture is located proximate a windshield of the vehicle.

5. The interior structural assembly of claim 1, wherein the speaker mounting structure is recessed with respect to a top surface of the at least one of the first and second panel extensions.

6. The interior structural assembly of claim 1, wherein the instrument panel includes a speaker ledge that is recessed with respect to the top surface of the instrument panel and that corresponds with a shape of the speaker mounting structure.

7. The interior structural assembly of claim 6, wherein the speaker ledge is connectable to a speaker grille such that when installed a top surface of the speaker grille is substantially flush with the top surface of the instrument panel.

8. The interior structural assembly of claim 1, wherein the instrument panel includes an instrument panel aperture that corresponds with a location of the speaker mounting structure.

9. The interior structural assembly of claim 1, wherein the speaker mounting structure includes a speaker aperture that receives at least a portion of the vehicle speaker.

10. The interior structural assembly of claim 1, wherein the speaker mounting structure includes at least one speaker fastening structure molded on a bottom surface of the at least one of the first and second panel extensions and wherein the at least one speaker fastening structure is configured to receive a fastener for attaching the vehicle speaker.

11. The interior structural assembly of claim 1, wherein the speaker mounting structure includes at least one locating projection connectable to a respective locating aperture in the vehicle speaker when the vehicle speaker is attached at the speaker mounting structure.

12. The interior structural assembly of claim 1, wherein at least a portion of edges of the defrost panel and instrument panel are connected in a snap-fit engagement when the instrument panel is installed to the defrost panel.

13. The interior structural assembly of claim 1, wherein the instrument panel is connectable to a body structure of the vehicle proximate the first and second panel extensions.

14. The interior structural assembly of claim 1, wherein the instrument panel substantially conceals the defrost panel.

15. An interior structural assembly for a vehicle, comprising:
a defrost panel forming at least a portion of a defrost duct, the defrost panel having first and second panel extensions laterally extending at opposite ends of a defrost base; and
an instrument panel overlaying the defrost panel and having at least one defrost aperture and first and second ends generally horizontally extending across substantially the interior width of the vehicle, wherein the first and second panel extensions extend to the first and second ends of the instrument panel, respectively, wherein the defrost panel connects to the instrument panel via at least one fastener that passes through the instrument panel and engages the defrost panel, and wherein at least one of the first and second panel extensions includes a speaker mounting structure having at least one speaker fastening structure molded on a bottom surface of the at least one of the first and second panel extensions and configured to receive a fastener for attaching a vehicle speaker.

16. The interior structural assembly of claim 15, further comprising:
a vehicle speaker attached to the least one of the first and second panel extensions at the speaker mounting structure and positioned below a top surface of the instrument panel.

17. An interior structural assembly for a vehicle, comprising:
a defrost panel forming at least a portion of a defrost duct, the defrost panel having first and second panel extensions laterally extending at opposite ends of a defrost base, wherein the defrost panel is supported at the first and second panel extensions by side duct members of the vehicle respectively routed below the first and second panel extensions from the defrost base; and
an instrument panel overlaying the defrost panel and having at least one defrost aperture and first and second ends generally horizontally extending across substantially the interior width of the vehicle, wherein the first and second panel extensions extend to the first and second ends of the instrument panel, respectively, and at least one of the first and second panel extensions includes a speaker mounting structure having at least one locating projection connectable to a respective locating aperture in a vehicle speaker when the vehicle speaker is installed to the defrost panel.

18. The interior structural assembly of claim 17, wherein the first and second panel extensions include mounting standoffs connectable to the side duct members.

19. The interior structural assembly of claim 17, further comprising:
a vehicle speaker attached to the least one of the first and second panel extensions at the speaker mounting structure and positioned below a top surface of the instrument panel.

* * * * *